US012748574B2

(12) United States Patent
Sjölander

(10) Patent No.: US 12,748,574 B2
(45) Date of Patent: Sep. 29, 2026

(54) AUTOMATED WIDGET CODE GENERATION FROM DESIGN OBJECTS

(71) Applicant: Figma, Inc., San Francisco, CA (US)

(72) Inventor: Emil Sjölander, San Francisco, CA (US)

(73) Assignee: Figma, Inc., San Francisco, CA (US)

(*) Notice: Subject to any disclaimer, the term of this patent is extended or adjusted under 35 U.S.C. 154(b) by 202 days.

(21) Appl. No.: 18/142,453

(22) Filed: May 2, 2023

(65) Prior Publication Data

US 2023/0359444 A1 Nov. 9, 2023

Related U.S. Application Data

(60) Provisional application No. 63/338,405, filed on May 4, 2022.

(51) Int. Cl.
*G06F 8/34* (2018.01)
*G06F 8/38* (2018.01)

(52) U.S. Cl.
CPC . *G06F 8/34* (2013.01); *G06F 8/38* (2013.01)

(58) Field of Classification Search
None
See application file for complete search history.

(56) References Cited

U.S. PATENT DOCUMENTS 5,339,389 A 8/1994 Bates
7,770,122 B1 8/2010 Shaik
9,424,545 B1 8/2016 Lee
9,430,229 B1 8/2016 Zijst
10,606,576 B1 3/2020 Tung
10,620,921 B2 4/2020 Brebner
11,138,518 B1 10/2021 Yu
11,631,480 B1 * 4/2023 Linetsky ................ G16H 15/00 705/3
2008/0040426 A1 2/2008 Synstelien
2010/0192107 A1 7/2010 Takahashi
2010/0306181 A1 12/2010 Little
(Continued)

OTHER PUBLICATIONS

Jason Hill, "Awareness Support in a Groupware Widget Toolkit", Nov. 2023, ACM (Year: 2023).*
(Continued)

*Primary Examiner* — Lewis A Bullock, Jr.
*Assistant Examiner* — Mark A Gooray
(74) *Attorney, Agent, or Firm* — Squire Patton Boggs LLP; Sarah Mirza

(57) ABSTRACT

A network computer system provides a graphic application for a user device operated by a user. The network system can receive input that identifies a design object, and further generates design programming logic that, when executed through the graphic application, creates the design object. The network computer system can also receive input that identifies a behavior programming logic describing one or more interactions with the design object. The network computer system can generate widget programming logic for a widget object based on the design programming logic and the behavior programming logic that, when executed, creates an instance of the widget object in an environment of the graphic application. In examples, an instance of the widget object including an instance of the design object and the one or more interactions.

14 Claims, 4 Drawing Sheets

(56) References Cited

U.S. PATENT DOCUMENTS

| | | | |
|---|---|---|---|
| 2011/0113350 A1 | 5/2011 | Carlos | |
| 2011/0268262 A1 | 11/2011 | Jones | |
| 2012/0137227 A1* | 5/2012 | Gerken, III | G06F 8/38 715/747 |
| 2013/0111338 A1 | 5/2013 | Huo | |
| 2014/0108936 A1* | 4/2014 | Khosropour | H04L 41/0803 715/735 |
| 2014/0298200 A1* | 10/2014 | Cierniak | H04L 65/1069 715/753 |
| 2014/0310660 A1 | 10/2014 | Rosen | |
| 2015/0127753 A1 | 5/2015 | Tew | |
| 2016/0321449 A1 | 11/2016 | Surti | |
| 2017/0192656 A1 | 7/2017 | Pedrick | |
| 2017/0262294 A1 | 9/2017 | Yakan | |
| 2017/0339370 A1 | 11/2017 | Inoue | |
| 2018/0088915 A1 | 3/2018 | Yang et al. | |
| 2018/0181299 A1 | 6/2018 | Ouellette et al. | |
| 2019/0065440 A1 | 2/2019 | Lu et al. | |
| 2019/0146811 A1 | 5/2019 | Pell | |
| 2019/0179501 A1 | 6/2019 | Seeley | |
| 2019/0238602 A1 | 8/2019 | Lo | |
| 2019/0303880 A1 | 10/2019 | Hashimoto | |
| 2019/0361580 A1 | 11/2019 | Dowling et al. | |
| 2020/0042648 A1 | 2/2020 | Rao | |
| 2020/0050431 A1 | 2/2020 | Zilouchian Moghaddam | |
| 2020/0296147 A1 | 9/2020 | Eliason | |
| 2021/0208775 A1* | 7/2021 | Allington | G06F 3/0486 |
| 2021/0247967 A1 | 8/2021 | Wichary et al. | |
| 2021/0367986 A1 | 11/2021 | Davuluri et al. | |
| 2022/0108276 A1 | 4/2022 | Stringham | |
| 2022/0129118 A1 | 4/2022 | Hsu | |
| 2022/0263675 A1 | 8/2022 | Cupala | |
| 2022/0334704 A1 | 10/2022 | Lin | |
| 2022/0334806 A1 | 10/2022 | Lin | |
| 2022/0342644 A1 | 10/2022 | Fuetsch | |

OTHER PUBLICATIONS

Anonymous: “HTML editor—Wikipedia”. Apr. 13, 2022 pp. 1-4.

International Search Report and Written Opinion mailed Jun. 27, 2023 in PCT/US2023/015322.

International Search Report dated Aug. 18, 2023 in PCT/US2023/020890.

IPRP dated Jul. 3, 2024 in PCT/US2023/020890.

Written Opinion dated Apr. 10, 2024 in PCT/US2023/020890.

“Zack Qattan, “Collaborative Cursor Chat w/Croquet”, Nov. 30, 2020, youtube.com, pp. 1-15 (Year: 2020)”.

Anonymous: “Change cursor into custom text”, Dec. 24, 2018 (Dec. 24, 2018), XP055930588, the whole document, 2 pages.

International Search Report and The Written Opinion of The International Searching Authority mailed Dec. 12, 2022, for related PCT/US2022/041418 filed Aug. 24, 2022, 11 pages.

International Search Report and The Written Opinion of The International Searching Authority mailed Jul. 1, 2022, for related PCT/US2022/025626, filed Apr. 20, 2022, 17 pages.

International Search Report and The Written Opinion of The International Searching Authority mailed Nov. 28, 2022, for related PCT/US2022/040461 filed Aug. 16, 2022, 14 pages.

Paper by WeTransfer—Simple Sketch App, “Creativity at your fingertips”, 9 pages.

Wallace Evan: “Multiplayer Editing in Figma”, figma.com/blog, Sep. 28, 2016 (Sep. 28, 2016), XP055930547, the whole document, 7 pages.

* cited by examiner

AUTOMATED WIDGET CODE GENERATION FROM DESIGN OBJECTS

RELATED APPLICATIONS

This application claims benefit of priority to Provisional U.S. Patent Application No. 63/338,405, filed May 4, 2022; the aforementioned priority application being hereby incorporated by reference in its entirety.

TECHNICAL FIELD

Examples described herein relate to collaborative environments, and more specifically, to automated widget code generation from design objects.

BACKGROUND

Software design tools have many forms and applications. In the realm of application user interfaces, for example, software design tools require designers to blend functional aspects of a program with aesthetics and even legal requirements, resulting in a collection of pages that form the user interface of an application. Widgets on a user interface of an application enable user interaction with the user interface. For example, a widget and can comprise buttons, scroll features, hover-over elements, and other selectable objects on the user interface that collectively create the user experience.

DETAILED DESCRIPTION

Figure 1:
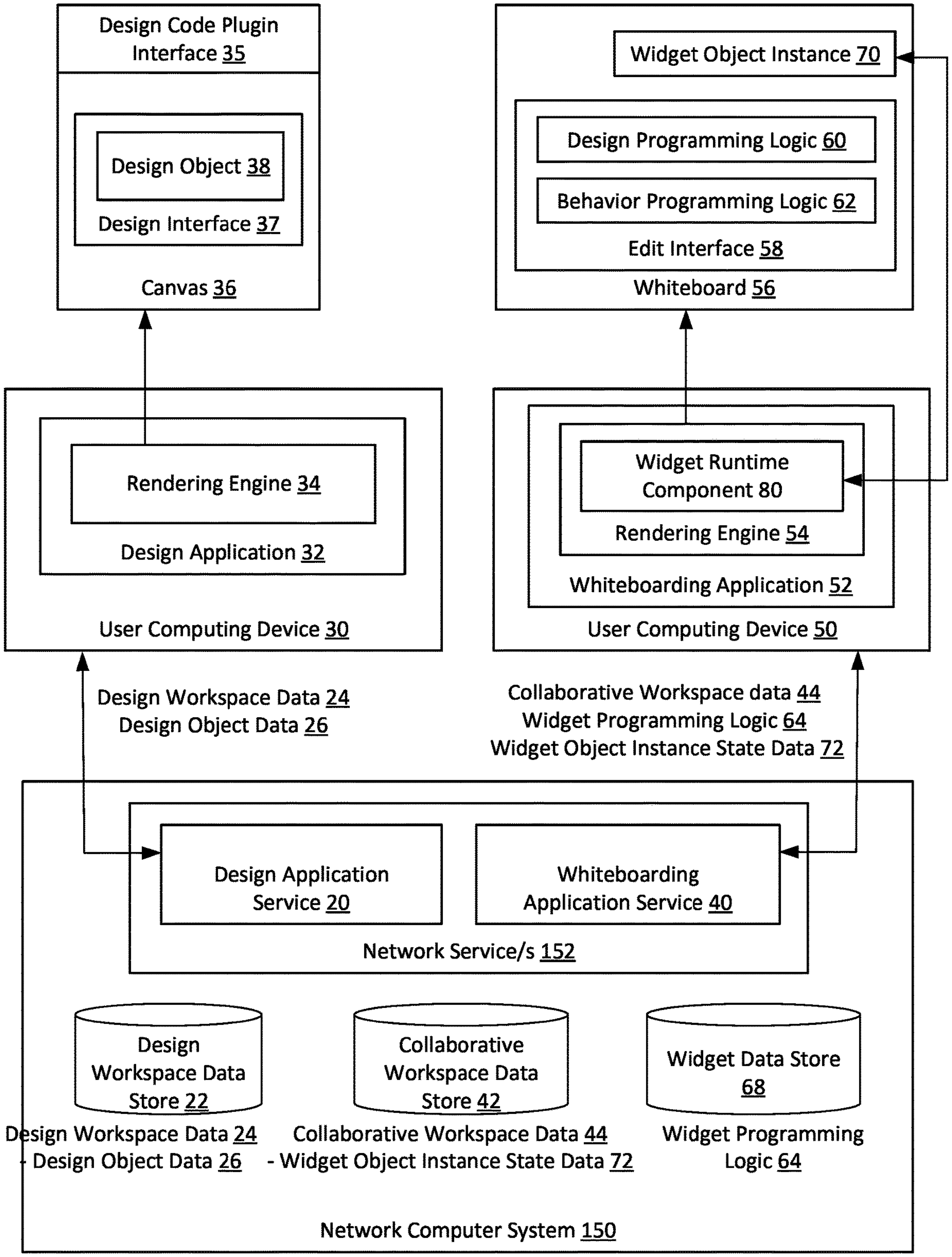
FIG. 1 illustrates a network computing system that implements automated widget code generation from design objects, according to one or more examples.

Examples include a network computing system that implements automated widget code generation from design objects, according to one or more examples. The network computing system enables an interactive graphic application platform for design and/or collaboration. The interactive graphic application platform may include, for example, a design application that enables users to create, view, and/or modify design objects; and/or a whiteboarding application that enables users to create interactive and/or visual content on a whiteboard environment or similar collaborative medium. Widgets can be implemented in such graphic applications to enable use of objects that include both functionality and design elements. While numerous examples are described in context of whiteboarding applications (or whiteboarding application services), in variations, examples as described can implemented for alternative graphic applications, such as design application (or design application services).

A widget may have a design aspect that can be rendered on a canvas (e.g., whiteboard used for whiteboarding application). A widget may also have interactive aspects that are responsive to user input from a set of users. An interactive widget object can be described by executable widget programming logic. When the widget programming logic is executed, an instance of the widget object is rendered on a whiteboard or other collaborative medium of a whiteboarding application. Examples as described further provide for the widget objects to be persistent and dynamically responsive to different types of user input.

In examples, the network computer system automatically generates at least a portion of a widget object's widget programming logic based on a design object. For example, in response to input in a graphic application (e.g., whiteboarding application) that identifies a design object created using the design application, the network computer system may generate design programming logic that creates the design object, such as by rendering the design object in a whiteboard or canvas. The network computer system may receive, in the graphic application, behavior programming logic that describes one or more interactions with the design object. The network computer system generates widget programming logic based on the design programming logic (e.g., the design programming logic that was automatically generated based on the selected design object) and the behavior programming logic (e.g., the behavior programming logic that was input by a user in the whiteboarding application). In some examples, the widget programming logic includes JavaScript code and/or React code.

According to examples, a network computer system operates to provide a design application for creating design interfaces to one or more first user devices operated by one or more first users. The network computer system maintains design workspace data describing a design interface including a design object created by the first one or more first users using the design application. The network computer system provides a whiteboarding application to a second user device operated by a second user. The network computer system receives, from the second user device through the whiteboarding application, input identifying the design object created by the one or more first users. In response to the input identifying the design object, the network computer system generates design programming logic that, when executed, creates the design object. The network computer system receives, from the second user device, behavior programming logic describing one or more interactions with the design object. The network computer system generates widget programming logic for a widget object based on the design programming logic and the behavior programming logic. When the behavior programming logic is executed at a user computing device, the user computing device creates an instance of the widget object in a whiteboard of a collaborative environment. The instance of the widget object includes an instance of the design object and is implements the one or more interactions with a set of users that access the whiteboard.

In examples, the network computer system provides the design programming logic corresponding to the design object selected from the second user device to the second user device in an edit interface. In examples, the edit interface allows a user of the second user device to input additional programming in the edit interface. For example, the user of the second user device may modify the design programming logic and/or add behavior programming logic. In some examples, the edit interface is provided in an instance of an edit interface object rendered on a first whiteboard of a first collaborative environment.

In examples, the input identifying the design object created using the design application includes reference programming logic that identifies the design object by reference. For example, the reference programming logic may be entered by the second user in an edit interface provided in an instance of an edit interface object rendered on a first whiteboard of a first collaborative environment.

In examples, the network computer system maintains a widget data store and stores the widget programming logic in association with the widget object. An instance of the widget object may be added to one or more whiteboards using the widget programming logic stored in association with the widget object. In some examples, in response to input from the second user (e.g., the user that creates the widget object by identifying the design object and providing the behavior programming logic) selecting the widget object in relation to a first whiteboard of a first collaborative workspace for a first plurality of users, the network computer system creates a first instance of the widget object in the first whiteboard.

In some examples, the network computer system provides the whiteboarding application to a third user device operated by a third user (e.g., a user different from the user that created the widget object). In response to input from the third user selecting the widget object in relation to a second whiteboard, the network computer system creates a second instance of the widget object in the second whiteboard.

In some examples, the network computer system maintains collaborative workspace data for a whiteboard of a collaborative environment. The collaborative workspace data includes state information for an instance of the widget object across a plurality of users.

In some examples, a network computer system is provided that includes memory resources that store a set of instructions. The network computer system includes one or more processors that are operable to communicate the set of instructions to a plurality of user devices. In examples, the set of instructions includes design application instructions corresponding to a design application and whiteboarding application instructions corresponding to a whiteboarding application. The design application instructions can be communicated to a first set of user computing devices. The first set of user computing devices execute the design application instructions to implement a design application that creates and/or modifies a design interface. The whiteboarding application instructions can be communicated to a second set of user computing devices. The second set of user computing devices execute the whiteboarding application instructions to execute a whiteboarding application that enables collaboration using a whiteboard or other collaborative medium.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented with instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices, and/or tablets), and magnetic memory. Computers, terminals, network-enabled devices (e.g., mobile devices, such as cell phones) are all examples of machines and devices that utilize processors, memory, and instructions stored on computer-readable mediums. Additionally, embodiments may be implemented in the form of computer programs, or a computer-usable carrier medium capable of carrying such a program.

System Overview

FIG. 1 illustrates a network computing system that implements automated widget code generation from design objects, according to one or more examples. A network computing system such as described with an example of FIG. 1 can be implemented using one or more servers that communicate with user computing devices over one or more networks. In examples, a network computing system 150 performs operations to enable an interactive collaborative application platform ("ICAP") to be implemented on user computing devices 30, 50. In examples, the ICAP enables one or more user computing devices 30, 50 to utilize one or more network services 152 for design and/or collaboration.

The network services 152 may include (i) a design application service 20 and (ii) a whiteboarding application service 40. The design application service 20 and the whiteboarding application service 40 may be provided by the same server or different servers. The design application service 20 and the whiteboarding application service 40 may utilize the same, different, or overlapping computers and/or computing resources. In examples, the design application service 20 and the whiteboarding application service 40 are distinct services, and the design application 32 and the whiteboarding application 52 are distinct applications. The design application service 20 and the whiteboarding application service 40 can provide the respective functionality to different sets of user computing devices 30, 50, which may overlap or not.

In examples, the design application 32 and/or the whiteboarding application 52 are implemented as one or more web applications. For example, the design application 32 and/or the whiteboarding application 52 may be implemented as a web application that executes in a browser application. A browser application executing on the respective user computing device 30, 50 may retrieve and execute scripts, code and/or other logic to implement one or more processes of the design application 32 and/or the whiteboarding application 52. A browser application may include any program that accesses web content over a network, such as by using the Hypertext Transfer Protocol (HTTP) to access information resources over the Internet. In some examples, the browser application is a commercially available browser application, such as but not limited to GOOGLE CHROME (developed by GOOGLE, INC.), SAFARI (developed by APPLE, INC.), and EDGE/INTERNET EXPLORER (developed by the MICROSOFT CORPORATION). As an addition or alternative, the design application 32 and/or the whiteboarding application 52 may be implemented as a native application developed for use on a particular platform, such as but not limited to LINUX, ANDROID, WINDOWS, and/or another platform.

In some examples, a user computing device 30, 50 retrieves some or all of the programmatic resources for implementing the design application 32 and/or the whiteboarding application 52 from a network site that executes the corresponding network service/s 152. As an addition or alternative, the design application 32 and/or the whiteboarding application 52 may access some or all of the programmatic resources from a local source (e.g., local memory residing with the user computing device 30, 50 and/or persistent memory of the user computing device 30, 50).

When the design application 32 and/or the whiteboarding application 52 executes in a browser application, one or more processes of the design application 32 and/or the whiteboarding application 52 can be implemented as web code, such as HTML, JAVASCRIPT, Cascading Style Sheets (CSS), other scripts, and/or other embedded code which the browser application downloads from a network site. For example, the browser application can execute web code that is embedded within a web page, causing the design application 32 and/or the whiteboarding application 52 to execute in the browser application at the user computer device 30, 50. The web code can also cause the browser application 80 to execute and/or retrieve other scripts and programmatic resources (e.g., libraries) from the network site and/or other local or remote locations.

The design application service 20 and the whiteboarding application service 40 may be provided by the same server or different services, and may utilize the same, different, or overlapping computing resources. In examples, the design application service 20 and the whiteboarding application service 40 are distinct services, and the design application 32 and the whiteboarding application 52 are distinct applications. Accordingly, the design application service 20 and the whiteboarding application service 40 can provide functionality and configurations that are distinct. The design application service 20 and the whiteboarding application service 40 can provide the respective functionality to different sets of user computing devices 30, 50, which may overlap or not.

Design Application Service

In examples, the design application service 20 enables users to create, view, and/or modify design interfaces 37. A design interface 37 may include any layout of content and/or interactive elements, such as but not limited to a web page and/or a user interface. A design interface 37 may include one or more design objects 38. A design object 38 may include a web page, user interface, or any component thereof. Design workspace data 24 refers to data describing a design interface 38 that can be loaded by the design application 32. The network computer system 150 maintains design workspace data 24 for each design interface 37 in a design workspace data store 22. When a particular design interface 37 includes a design object 38, the corresponding design workspace data 24 includes design object data 26 describing the design object 38 belonging to the design interface 37. In examples, the user computing device 30 accesses the design application service 20 to initiate a session in the design application 32.

In examples, the network computer system 150 includes a design workspace data store 22 that stores design workspace data 24 for one or more design interfaces 37. When a design application 32 executing on a user computing device 30 loads a design interface 37, the design application service 20 provides the corresponding design workspace data 24 to the user computing device 30. As an alternative or addition, the design workspace data 24 may be temporarily stored or persisted at the user computing device 30. For example, a local copy of the design workspace data 24 may be maintained in memory during runtime of the design application 32. As an alternative or addition, a persistent local copy of the design workspace data 24 may be maintained at the user computing device 30.

In examples, the design application 32 includes a rendering engine 34. The rendering engine 34 is configured to render a design interface 37, including one or more design objects 38, on a canvas 36 that is displayable on a display device associated with the user computing device 30. For example, when the design application 32 executes in a browser application, the design interface 37 and design object 38 may be rendered using programmatic resources that are associated with the browser application (e.g., on an HTML 5.0 canvas).

In examples, the design application service 20 updates the design workspace data 24 based on actions performed in the design application 32 by the corresponding user. In examples, the design application service 20 updates and synchronizes the design workspace data 24 across multiple user computing devices 30, such as when multiple users are accessing the design interface in instances of the design application 32 executing on multiple user computing devices 30. The design application service 20 may thereby enable collaboration on the design interface 37 by multiple users of the multiple user computing devices 30.

One or more examples of a design application 32 and/or a design application service 20 are described in U.S. patent application Ser. No. 16/682,982, entitled "System and method for implementing design system to provide preview of constraint conflicts", filed Nov. 13, 2019, the entire contents of which are hereby incorporated by reference as if fully set forth herein.

Whiteboarding Application Service

In examples, the whiteboarding application service 40 enables users to create interactive and/or visual content on a whiteboard 56 or other collaborative medium. A whiteboard 56 is a collaborative medium that includes visual and/or interactive content, allowing a group of multiple users on multiple user computing devices 50 share ideas. The whiteboarding application service 40 may support execution of a whiteboarding application 52 on the corresponding user computing device/s 50. In examples, the user computing device 50 accesses the whiteboarding application service 40 to initiate a session in the whiteboarding application 52 to create, view, modify, and/or otherwise interact with a whiteboard 56 or other collaborative medium.

Collaborative workspace data 44 refers to data describing a whiteboard 56 or other collaborative medium that can be loaded by the whiteboarding application 52. The network computer system 150 maintains collaborative workspace data 44 for each whiteboard 56 in a collaborative workspace data store 44. In examples, the network computer system 150 includes a collaborative workspace data store 42 that stores collaborative workspace data 44 for one or more whiteboards 56. When a whiteboarding application 52 executing on a user computing device 50 loads a whiteboard 56, the whiteboarding application service 40 provides the corresponding collaborative workspace data 44 to the user computing device 50. As an alternative or addition, the collaborative workspace data 44 may be temporarily stored and/or persisted at the user computing device 50. For example, a local copy of the collaborative workspace data 44 may be maintained in memory during runtime of the whiteboarding application 52. As an alternative or addition, a persistent local copy of the collaborative workspace data 44 may be maintained at the user computing device 50.

In examples, the whiteboarding application 52 includes a rendering engine 54. The rendering engine 54 is configured to render a whiteboard 56 that is displayable on a display device associated with the user computing device 50. For example, when the whiteboarding application 52 executes in a browser application, the whiteboarding 56 may be rendered using programmatic resources that are associated with the browser application (e.g., on an HTML 5.0 canvas).

In examples, the whiteboarding application service 40 updates the collaborative workspace data 44 based on actions performed in the whiteboarding application 52 by the corresponding user. In examples, the whiteboarding application service 40 updates and synchronizes the whiteboard 44 across multiple user computing devices 50, such as when multiple users are accessing the whiteboarding in instances of the whiteboarding application 52 executing on multiple user computing devices 50. The instances of application service 40 may thereby enable collaboration on the whiteboard 56 by multiple users of the multiple user computing devices 50.

One or more examples of a whiteboarding application 52 and/or a whiteboarding application service 52 are described in U.S. Provisional Patent Application Ser. No. 63/236,645, titled "Integrated Application Platform to Implement Widgets", filed Aug. 24, 2021 the entire contents of which are hereby incorporated by reference as if fully set forth herein.

Widget Programming Logic

A widget, or widget object, is an interactive object that can be added to a whiteboard 56 or other collaborative environment. A widget object can be created by an operator of the network computer system 150 and/or a third party, such a user of the whiteboarding application 52, a third party-developer, a third-party organization, or other third parties. A widget object is defined by widget programming logic 64 that may include executable code that provides the widget's functionality. A widget object may be integrated with one or more whiteboards 56, a whiteboarding application 52, and/or a whiteboarding application service 40 as described in greater detail herein.

A widget may have a design aspect that can be rendered on a whiteboard 56. A widget may also have interactive aspects that are responsive to user input from a set of users. For example, a widget may be programmed to carry out one or more interactions with one or more users of the whiteboard 56. The interactive aspects of a widget may be tied to one or more design aspects of the widget. For example, an example widget may include design aspects such as a displayed number and a button. The interactive aspect of the example widget may include incrementing the displayed number for all users of the whiteboard 56 when any user of the whiteboard 56 clicks the button. In some examples, the widget programming logic 64 for a widget includes (i) design programming logic 60 that defines the design aspects of the widget and (ii) behavior programming logic 62 that defines the interactive aspects of the widget. For the example widget above, the design programming logic 60 may define the appearance of the button and the displayed number, while the behavior programing logic may define the processing of clicks of the button by the corresponding users, and the incrementing of the displayed number in response to the clicks. In some examples, the widget programming logic 64 includes JavaScript code and/or React code. When the widget programming logic 64 for a widget object is executed in the context of a whiteboard 56, an instance of the widget object (e.g., widget object instance 70) is rendered on the whiteboard 56 based on the design programming logic 60.

When the widget programming logic 64 for a widget object is executed in the context of a whiteboard 56, an instance of the widget object (e.g., widget object instance 70) is rendered on the whiteboard 56. When the design programming logic 60 is automatically generated based on a selected design object 38, the rendering of the widget object instance 70 is a representation of the design object 38. For example, a user of the whiteboarding application 52 may select the widget object to add to a specified whiteboard 56, causing the associated widget programming logic 64 to be executed to generate the widget object instance 70 in the specified whiteboard 56, including a representation of the design object 38 that the widget object is based on.

The whiteboarding application service 40 may provide an input interface that allows a user of the whiteboarding application 52 to create and/or modify a widget object, such as by creating and/or modifying widget programing logic 64 corresponding to the widget object. In some examples, the input interface allows the user to upload the widget programming logic 64. As an addition or alternative, the input interface allows the user to load, enter, and/or edit the widget programming logic 64. For example, the input interface may allow the user to load existing widget programming logic 64 from the widget data store 68 of the network computer system 150 or from another source. The network computer system 150 may store the widget programming logic 64 in association with the widget object in the widget data store 68 or another location.

In examples, a widget object is associated with one or more resources provided by a third-party that are external to the network computer system 150. As an alternative or addition, one or more widget object resources can reside on the network computer system 150, such as with a widget data store 68. The resources of each widget object, can include data and/or widget programming logic 64, such as scripts, code and/or other executable instructions. For a given object widget, the widget data store 68 can include transactional and distributive logic that is (i) communicated to the user computing device 50 in response to one or more predetermined events (e.g., user interactions), and (ii) executed by a widget runtime component 80 of the rendering engine 54 in response to the predetermined events. In examples, the widget programming logic 64 includes (i) design programming logic 60 that is initially provided by the network computer system 150 to render the widget object instance 70 on the whiteboard 56, and (ii) behavior programming logic 62 logic that is embedded with the whiteboard 56 to be triggerable through user interaction and/or other predetermined events that may occur with respect to the whiteboard 56.

After a widget object is created, the widget object may be used to generate widget object instances 70 in one or more whiteboards 56. The widget object may be made available to a set of users. In some examples, the creator of the widget object may control the users to which the widget object is made available. As an addition or alternative, a widget object may be made available to all users of the whiteboarding application 52.

The whiteboarding application service 40 may communicate one or more portions of the widget programming logic 64 to the user computing device 50 at one time or at different times, such as at an initial time when the widget object instance 70 is first rendered, and at subsequent times such as after detected user interactions with the widget object instance 70. In examples, the widget programming logic 64 can also be copied and/or stored in cache or with other local resources, such that in subsequent instances, the widget runtime component 180 retrieves the widget programming logic 64 from the local resource rather than from the network computer system 150.

In examples, the whiteboarding application service 40 provides a selection of widgets to a user of the whiteboarding application 52 as a widget library, thereby allowing the user to access a collection of widgets. A user may be provided access to a particular set of widgets based on permissions for the corresponding user account. In some examples, the network computer system 150 implements a widget library, marketplace, or other collection. Users may be provided with browsing and/or search functionality for finding and selecting individual widgets for use with a whiteboard 56.

Automated Widget Code Generation

In examples, the network computer system 150 automatically generates at least a portion the widget programming logic 64 that defines a widget object based on a design object 38. The network computer system 150 may generate widget programming logic 64 by providing executable code that causes generation of the widget programming logic 64 at a client device (e.g., user computing device 30, user computing device 50). As an alternative or addition, the network computer system 150 may generate the widget programming logic 64 locally. In examples, widget programming logic 64 is generated for a design object 38 that is be selected through the design application 32. As an alternative or addition, widget programming logic 64 may be generated for a design object 38 that is be selected through the whiteboarding application 52. The examples provided below are non-limiting examples of automatic widget programming logic 64 generation.

Example—Design Plugin for Automatic Widget Code Generation in Design Application For example, to automatically generate widget code using the design application 32, the design application 32 may provide a design code plugin interface 35 that allows a user of the whiteboarding application 52 to select a design object 38. The selected design object 38 may be a design object 38 belonging to design workspace data 24 currently loaded in the design application 32, or another design object belonging to other design workspace data 24 stored in the design workspace data store 22.

In examples, the design code plugin interface 35 is the user interface of a design code plugin that processes the design object data 26 corresponding to the selected design object 38 to generate design programming logic 60 that creates the design object 38. When the design programming logic 60 is executed in the context of a whiteboard 56, a representation of the design object 38 is rendered in the whiteboard 56. In examples, the design programming logic 60 is provided by the design code plugin through the design code plugin interface 35. For example, the design programming logic 60 may be presented as text that can be copied for use by a developer.

Example—Automatic Widget Code Generation in Whiteboarding Application

As an alternative or addition, to automatically generate widget code using the whiteboarding application 62, the whiteboarding application 52 may provide an input interface that allows a user of the whiteboarding application 52 to select a design object 38 created using a design application 32 and/or a design application service 20. The design object 38 may be stored as design object data 26 in a design workspace data store 22 in a network computer system 150 that provides both the design application service 20 and the whiteboarding application service 40. As an alternative or addition, the design object 38 may be created in and/or stored by a different network system than the network computer system 150 that provides the whiteboarding application service 40.

In response to input in the that identifies the design object 38, the network computer system 150 generates design programming logic 60 that creates the design object 38. When the design programming logic 60 is executed in the context of a whiteboard 56, a representation of the design object 38 is rendered in the whiteboard 56.

The network computer system 150 receives, from the whiteboarding application 52, behavior programming logic 62 that describes one or more interactions with the design object 38. For example, the whiteboarding application service 40 may provide an input interface that allows a user of the whiteboarding application 52 to enter the behavior programming logic 62.

The network computer system generates widget programming logic 64 based on the design programming logic 60 (e.g., the design programming logic 60 that was automatically generated based on the selected design object) and the behavior programming logic 62 (e.g., the behavior programming logic 62 that was input by a user in the whiteboarding application 52). In some examples, the widget programming logic 64 includes JavaScript code and/or React code.

In examples, the network computer system 150 implements an edit interface 58. An edit interface is an input interface that allows a user of the whiteboarding application 52 to view, modify, and/or create widget programming logic. In examples, the whiteboarding application service 40 provides the edit interface 58 as an interactive object in a whiteboard 56 that a user can access through the whiteboarding application 52. For example, the network computer system 150 may implement an edit interface object that can be added to a whiteboard 56 as an interactive component that can be rendered by the rendering engine 54.

In examples, after the network computer system 150 automatically generates design programming logic 60 based on a design object 38, the whiteboarding application service 40 provides the design programming logic 60 to the user in an edit interface 58 via the whiteboarding application 52. The edit interface 58 allows the user to input additional programming in the edit interface 58. For example, the user may modify the design programming logic 60 and/or add behavior programming logic 62 to complete the widget programming logic 64 necessary to fully define the widget object.

In examples, the user enters input identifying the design object 38 into the edit interface 58. For example, the user may enter reference programming logic that identifies the design object 38 by reference. For example, the reference may include a uniform resource locator (URL) for design object data 26 corresponding to the design object 38.

Methodology

Figure 3:
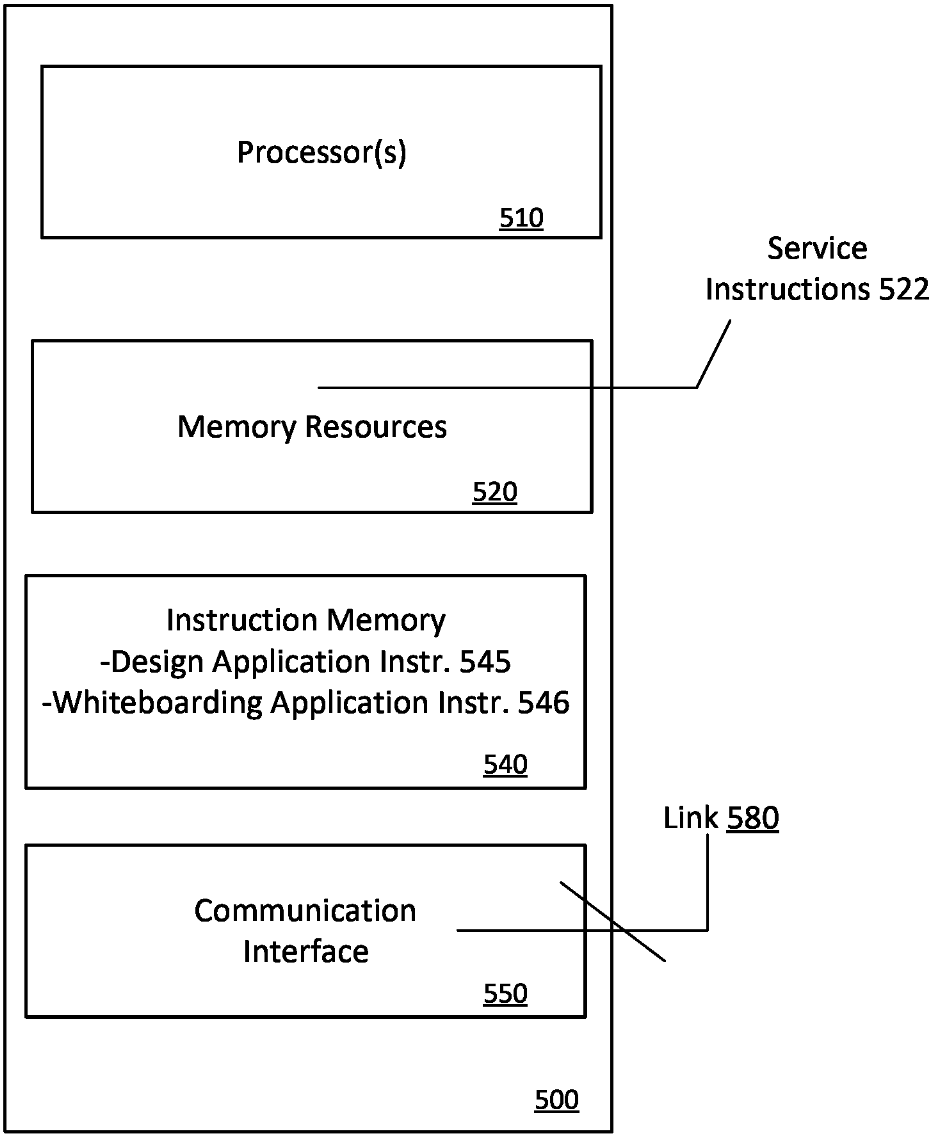
FIG. 3 illustrates a computer system on which one or more embodiments can be implemented.

FIG. 3 illustrates an example method for automated widget code generation from design objects, according to one or more embodiments. Process 200 may be performed by one or more computing devices and/or processes thereof. For example, one or more blocks of process 200 may be performed by a network computer system (e.g., network computer system 150).

At block 210, the network computer system provides a design application for creating design interfaces to one or more first user devices operated by one or more first users.

At block 220, the network computer system maintains design workspace data describing a design interface including a design object created by the first one or more first users using the design application.

At block 230, the network computer system provides a whiteboarding application to a second user device operated by a second user. In examples, the whiteboarding application is distinct from the design application.

At block 240, the network computer system receives input identifying the design object created by the one or more first users. In examples, the input identifying the design object created using the design application includes reference programming logic that identifies the design object by reference. In some examples, the input identifying the design object is received from the second user device through the whiteboarding application. As an alternative or addition, the input identifying the design object may be received through a design code plugin interface wherein the input identifying the design object is received a design code plugin interface of a design code plugin.

At block 250, in response to the input identifying the design object, the network computer system generates design programming logic that, when executed, creates the design object. In examples, the network computer system provides the design programming logic to the second user device in an edit interface. For example, the edit interface may be provided in an instance of an edit interface object rendered on a first whiteboard of a first collaborative environment At block 260, the network computer system receives behavior programming logic describing one or more interactions with the design object. In examples, the additional programming logic comprises input from the second user on the second user device in an edit interface, such as but not limited to an edit interface provided in an instance of an edit interface object rendered on a first whiteboard of a first collaborative environment.

At block 270, the network computer system generates widget programming logic for a widget object based on the design programming logic and the behavior programming logic that, when executed, creates an instance of the widget object in a whiteboard of a collaborative environment, the instance of the widget object including an instance of the design object and the one or more interactions. In examples, the widget programming logic includes JavaScript code and/or React code.

In examples, the network computer system creates a first instance of the widget object in the first whiteboard in response to input from the second user selecting the widget object in relation to a first whiteboard of a first collaborative workspace for a first plurality of users. The network computer system may maintain first collaborative workspace data comprising state information for the first instance of the widget object across the first plurality of users.

In examples, the network computer system provides the whiteboarding application to a third user device operated by a third user, and in response to input from the third user selecting the widget object in relation to a second whiteboard, creates a second instance of the widget object in the second whiteboard.

Network Computer System

FIG. 3 illustrates a computer system on which one or more embodiments can be implemented. A computer system 500 can be implemented on, for example, a server or combination of servers. For example, the computer system 500 may be implemented as a network computing system (e.g. network computing system 150).

In one implementation, the computer system 500 includes processing resources 510, memory resources 520 (e.g., read-only memory (ROM) or random-access memory (RAM)), one or more instruction memory resources 540, and a communication interface 550. The computer system 500 includes at least one processor 510 for processing information stored with the memory resources 520, such as provided by a random-access memory (RAM) or other dynamic storage device, for storing information and instructions which are executable by the processor 510. The memory resources 520 may also be used to store temporary variables or other intermediate information during execution of instructions to be executed by the processor 510.

The communication interface 550 enables the computer system 500 to communicate with one or more user computing devices, over one or more networks (e.g., cellular network) through use of the network link 580 (wireless or a wire). Using the network link 580, the computer system 500 can communicate with one or more computing devices, specialized devices and modules, and/or one or more servers.

Figure 2:
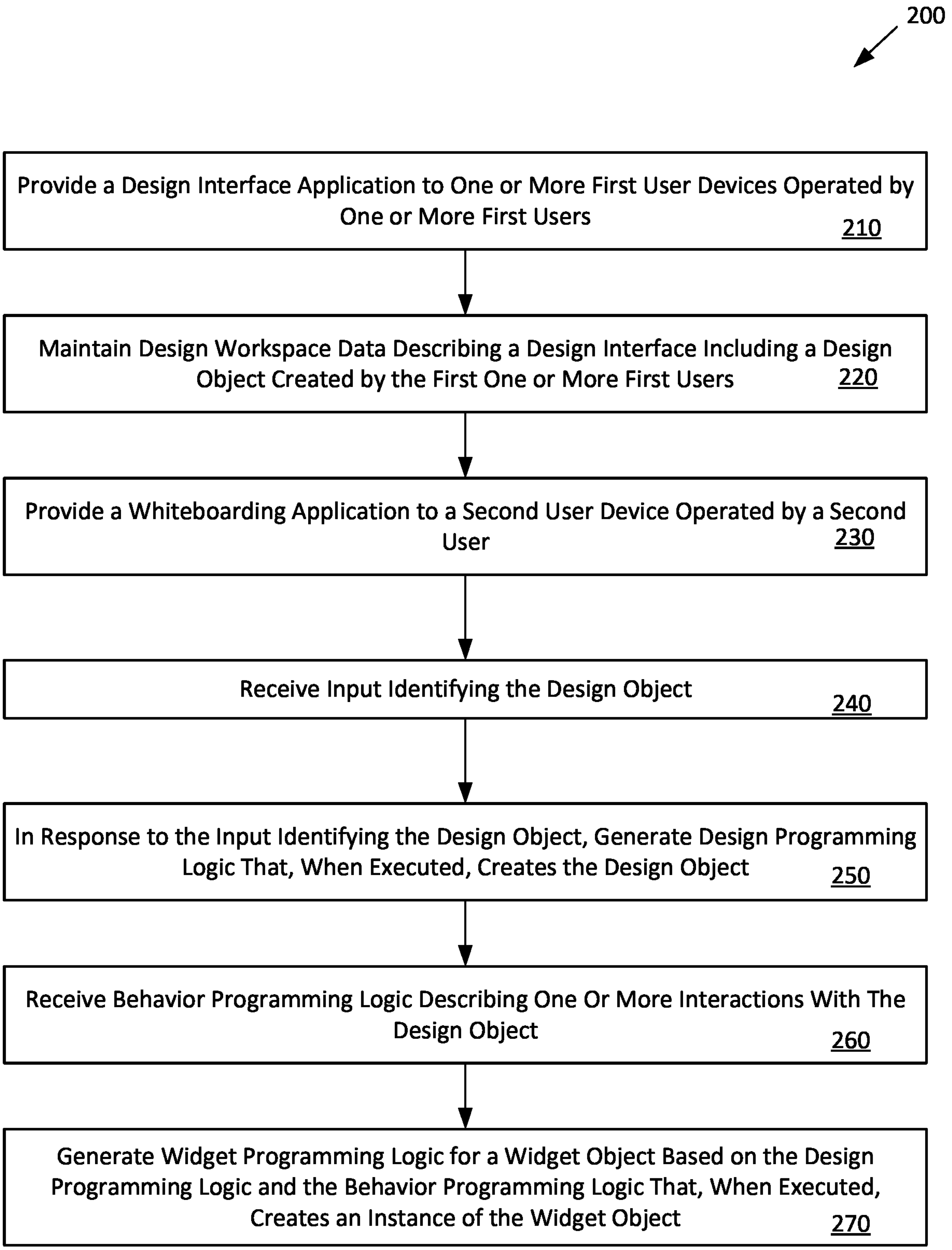
FIG. 2 illustrates an example method for automated widget code generation from design objects, according to one or more embodiments.

In examples, the processor 510 may execute service instructions 522, stored with the memory resources 520, in order to enable the network computing system to implement the network service 152 and operate as the network computing system 150 in examples such as described with FIGS. 1-3.

The computer system 500 may also include additional memory resources (e.g., instruction memory 540) for storing executable instruction sets (e.g., design application instructions 545, widget application instructions 546) which are embedded with web-pages and other web resources, to enable user computing devices to implement functionality such as described with the design application 32 and/or the whiteboarding application 52. In examples, the computer system 500 can communicate the design application instructions 545 and/or the widget application instructions 546 to user computing devices 30, 50.

As such, examples described herein are related to the use of the computer system 500 for implementing the techniques described herein. According to an aspect, techniques are performed by the computer system 500 in response to the processor 510 executing one or more sequences of one or more instructions contained in the memory 520. Such instructions may be read into the memory 520 from another machine-readable medium. Execution of the sequences of instructions contained in the memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

User Computing Device

Figure 4:
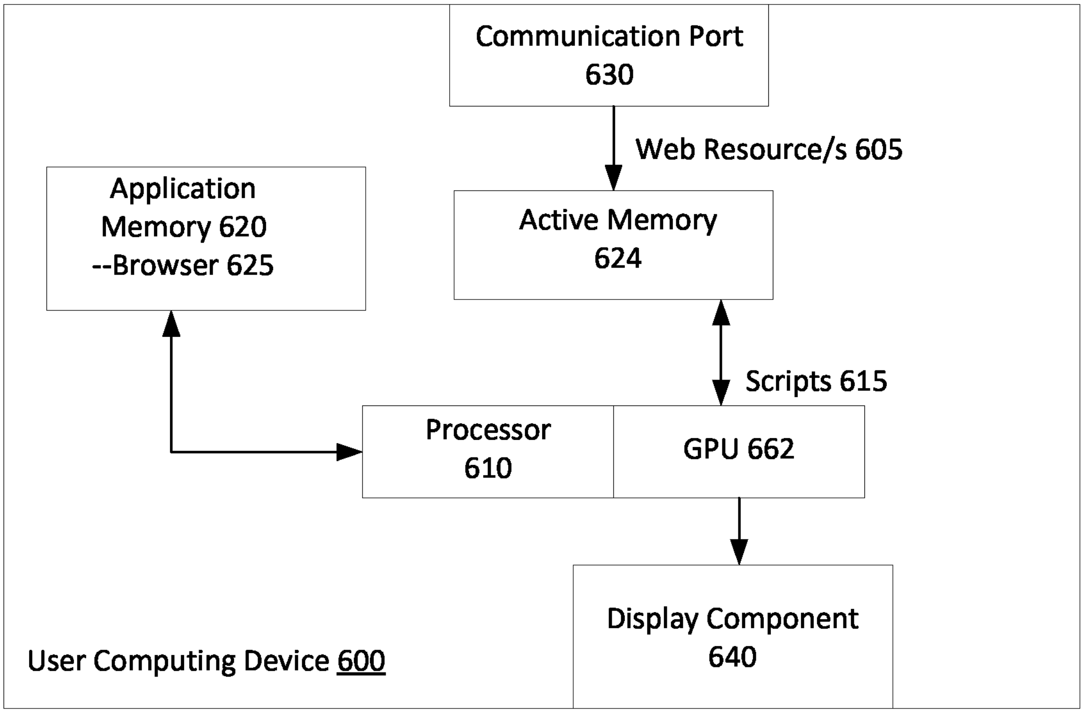
FIG. 4 illustrates a user computing device for use with one or more examples, as described.

FIG. 4 illustrates a user computing device for use with one or more examples, as described. In examples, a user computing device 600 can correspond to, for example, a workstation, a desktop computer, a laptop or other computer system having graphics processing capabilities that are suitable for enabling renderings of design interfaces and graphic design work. In variations, the user computing device 600 can correspond to a mobile computing device, such as a smartphone, tablet computer, laptop computer, VR or AR headset device, and the like.

In examples, the computing device 600 includes a central or main processor 610, a graphics processing unit 612, memory resources 620, and one or more communication ports 630. The computing device 600 can use the main processor 610 and the memory resources 620 to store and launch a browser 625 or other web-based application. A user can operate the browser 625 to access a network site of the network service 152, using the communication port 630, where one or more web pages or other web resources 605 for the network service 152 (see FIGS. 1-3) can be downloaded. The web resources 605 can be stored in the active memory 624 (cache).

As described by various examples, the processor 610 can detect and execute scripts and other logic which are embedded in the web resource in order to implement the ICAP 100 (see FIGS. 1-3). In some of the examples, some of the scripts 615 which are embedded with the web resources 605 can include GPU accelerated logic that is executed directly by the GPU 612. The main processor 610 and the GPU can combine to render a design interface (e.g. design interface 37) and/or a whiteboard (e.g. whiteboard 56) on a display component 640. The rendered design interface can include web content from the browser 625, as well as design interface content and functional elements generated by scripts and other logic embedded with the web resource 605. By including scripts 615 that are directly executable on the GPU 612, the logic embedded with the web resource 615 can better execute the ICAP 100, as described with various examples.

Conclusion

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:

one or more processors; and at least one memory storing instructions that, when executed by the one or more processors, perform operations including:

serving a design application for execution on a first browser for creating design interfaces to one or more first user devices operated by one or more first users, wherein the one or more first users operate the design application to create a design object by providing first user input to the one or more first user devices;

maintaining design workspace data describing a design interface including the design object;

serving a whiteboarding application for execution on a second browser on a second user device operated by a second user;

receiving second user input from the second user identifying the design object created by the one or more first users;

in response to the second user input identifying the design object, programmatically accessing the design workspace data to capture one or more design elements of the design object;

generating design programming logic in response to the second user input and based on the one or more design elements that, when executed, creates the design object;

executing the design programming logic to create the design object in the whiteboarding application;

receiving third user input from the second user indicating one or more interactions with the design object that modify the one or more design elements;

generating, in response to the second user input and the third user input and based on the one or more design elements, behavior programming logic describing the one or more interactions with the design object;

generating widget programming logic for a widget object based on the design programming logic and the behavior programming logic that, when executed, creates an instance of the widget object; and executing the widget programming logic to create the instance of the widget object in the whiteboarding application, the instance of the widget object including an instance of the design object and the one or more interactions.

2. The network computer system of claim 1, wherein the second user input identifying the design object is received by a design code plugin interface of a design code plugin; and wherein the design code plugin generates the design programming logic.

3. The network computer system of claim 1, wherein the second user input identifying the design object is received from the second user device through the whiteboarding application.

4. The network computer system of claim 3, wherein the behavior programming logic is received from the second user device.

5. The network computer system of claim 1, wherein the instructions, when executed by the one or more processors, perform operations including:

providing the design programming logic to the second user device in an edit interface, wherein the third user input from the second user in the edit interface includes additional programming logic.

6. The network computer system of claim 5, wherein the edit interface is provided in an instance of an edit interface object rendered on the whiteboard application.

7. The network computer system of claim 1, wherein the second user input identifying the design object created using the design application includes reference programming logic that identifies the design object by reference.

8. The network computer system of claim 1, wherein the instructions, when executed by the one or more processors, perform operations including:

in response to the second user input from the second user selecting the widget object in relation to a first whiteboard of a first collaborative workspace for a first plurality of users, creating a first instance of the widget object in the first whiteboard.

9. The network computer system of claim 8, wherein the instructions, when executed by the one or more processors, perform operations including:

maintaining first collaborative workspace data comprising state information for the first instance of the widget object across the first plurality of users.

10. The network computer system of claim 1, wherein the instructions, when executed by the one or more processors, perform operations including:

providing the whiteboarding application to a third user device operated by a third user; and in response to fourth user input from the third user selecting the widget object in relation to a second whiteboard, creating a second instance of the widget object in the second whiteboard.

11. The network computer system of claim 1, wherein the widget programming logic includes JavaScript code.

12. The network computer system of claim 1, wherein the widget programming logic includes React code.

13. The network computer system of claim 1, wherein the whiteboarding application is distinct from the design application.

14. A method for providing a graphic application design platform, the method being implemented by one or more processors and comprising:

serving a design application for execution on a first browser for creating design interfaces to one or more first user devices operated by one or more first users, wherein the one or more first users operate the design application to create a design object by providing first user input to the one or more first user devices;

maintaining design workspace data describing a design interface including the design object;

serving a whiteboarding application for execution on a second browser on a second user device operated by a second user;

receiving second user input from the second user identifying the design object created by the one or more first users;

in response to the second user input identifying the design object, programmatically accessing the design workspace data to capture one or more design elements of the design object;

generating design programming logic in response to the second user input and based on the one or more design elements that, when executed, creates the design object;

executing the design programming logic to create the design object in the whiteboarding application;

receiving third user input from the second user indicating one or more interactions with the design object that modify the one or more design elements;

generating, in response to the second user input and the third user input and based on the one or more design elements, behavior programming logic describing the one or more interactions with the design object;

generating widget programming logic for a widget object based on the design programming logic and the behavior programming logic that, when executed, creates an instance of the widget object; and executing the widget programming logic to create the instance of the widget object in the whiteboarding application, the instance of the widget object including an instance of the design object and the one or more interactions.

* * * * *